United States Patent
Sarasmo

(10) Patent No.: US 8,294,688 B2
(45) Date of Patent: Oct. 23, 2012

(54) RESISTIVE TOUCH SCREEN APPARATUS, A METHOD AND A COMPUTER PROGRAM

(75) Inventor: Marko Antero Sarasmo, Haukipudas (FI)

(73) Assignee: Nokia Corporation, Espoo (FI)

( * ) Notice: Subject to any disclaimer, the term of this patent is extended or adjusted under 35 U.S.C. 154(b) by 542 days.

(21) Appl. No.: 12/387,253

(22) Filed: Apr. 29, 2009

(65) Prior Publication Data

US 2010/0277417 A1    Nov. 4, 2010

(51) Int. Cl.
*G06F 3/041* (2006.01)

(52) U.S. Cl. ......................... 345/174; 345/173
(58) Field of Classification Search ........................ None
See application file for complete search history.

(56) References Cited

U.S. PATENT DOCUMENTS

| | | | |
|---|---|---|---|
| 4,897,511 A | 1/1990 | Itaya et al. | 128/18 |
| 5,008,497 A | 4/1991 | Asher | 178/18 |
| 7,053,887 B2 | 5/2006 | Kraus et al. | 345/173 |
| 2005/0046621 A1* | 3/2005 | Kaikuranta | 345/173 |
| 2009/0073131 A1 | 3/2009 | Yeh | 345/173 |
| 2009/0085888 A1 | 4/2009 | Ho | 345/174 |
| 2009/0109191 A1 | 4/2009 | Felder et al. | 345/174 |
| 2009/0322700 A1* | 12/2009 | D'Souza et al. | 345/174 |
| 2009/0322701 A1 | 12/2009 | D'Souza et al. | 345/174 |

FOREIGN PATENT DOCUMENTS

EP    1 436 772 B1    6/2007

OTHER PUBLICATIONS

Loviscach, J., "Two-Finger Input with a Standard Touch Screen", UIST 07, Oct. 7-10, 2007, Newport, Rhode Island.
Texas Instruments, "1.6V to 3.6V, 12-Bit, Nanopower, 4-Wire Touch Screen Controller with SPI Interface", Product Folder TSC2005, SBAS379C, Dec. 2006, Revised Mar. 2008.

* cited by examiner

*Primary Examiner* — Joseph Haley
(74) *Attorney, Agent, or Firm* — Harrington & Smith

(57) ABSTRACT

An apparatus including: a first resistive screen extending in a first direction and a second direction; a second resistive screen extending in the first direction and the second direction and separated from the first resistive screen; a first reference resistor; a voltage source configured to apply a voltage across a series combination of the first reference resistor and the first resistive screen; and a voltage detector configured to measure a first voltage across the reference resistor.

18 Claims, 9 Drawing Sheets

PHASE 1

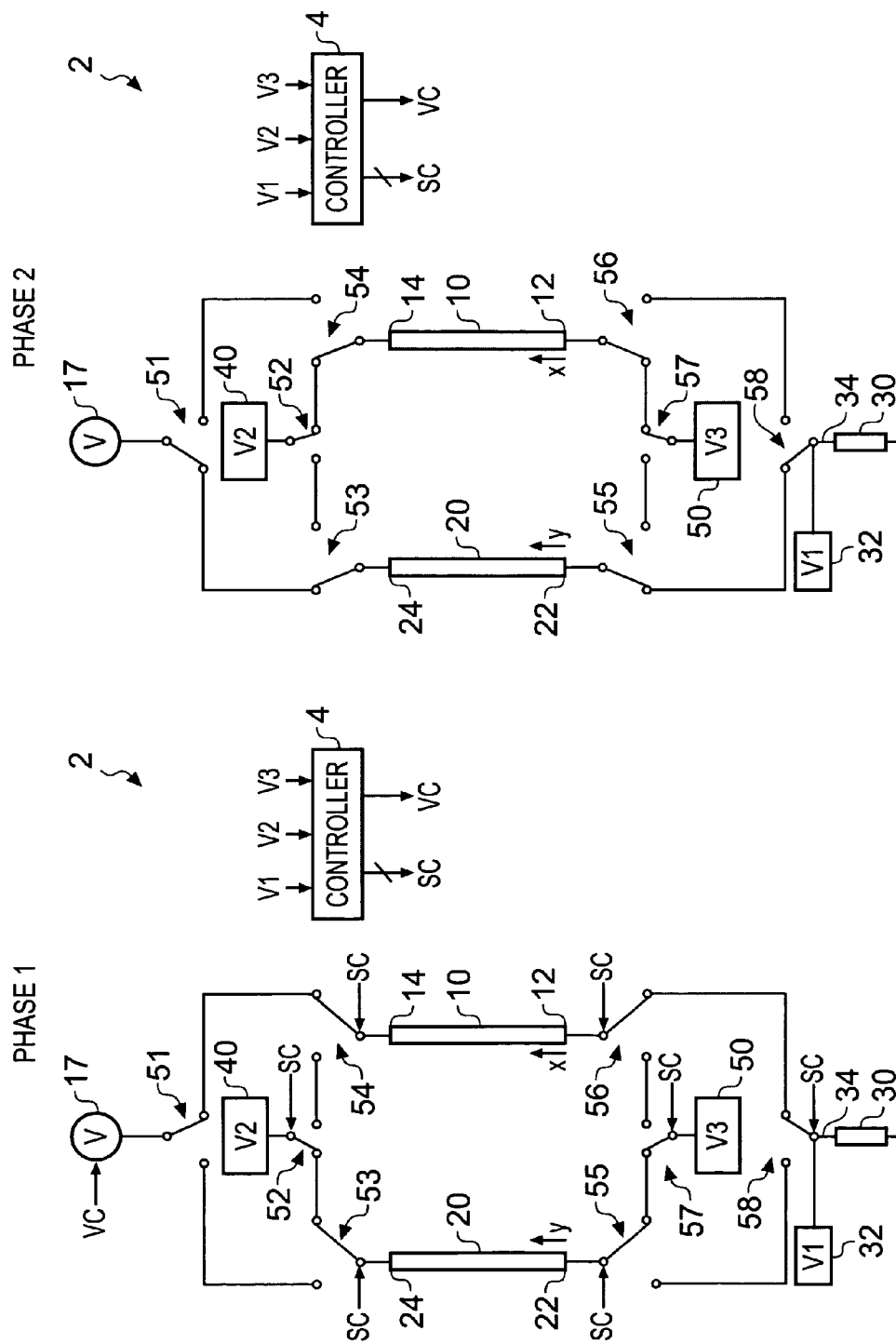

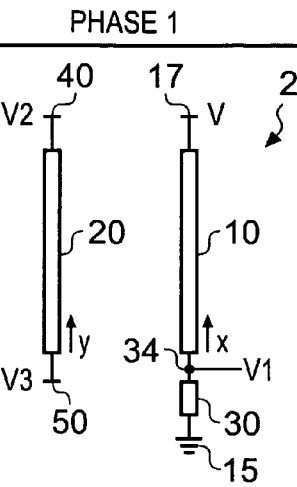
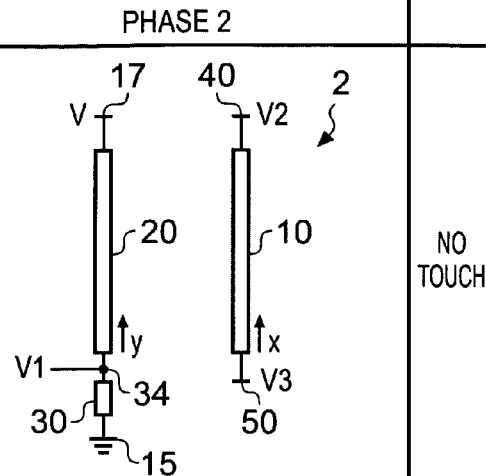
FIG. 4A     FIG. 4B
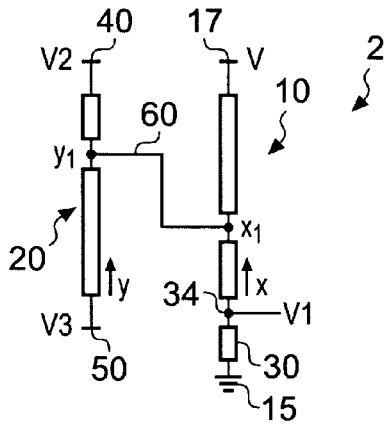
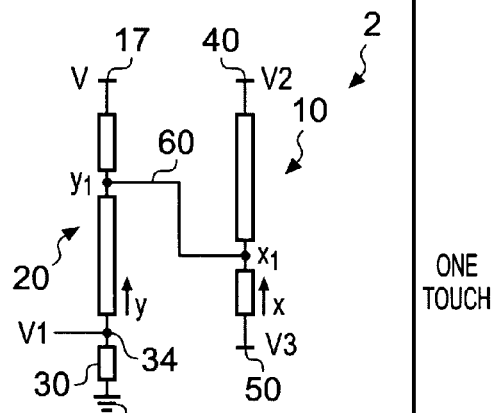
FIG. 5A     FIG. 5B
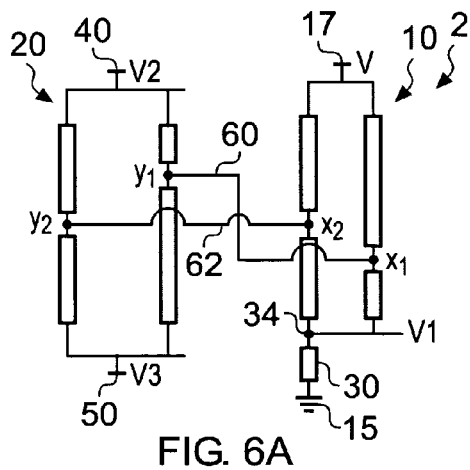
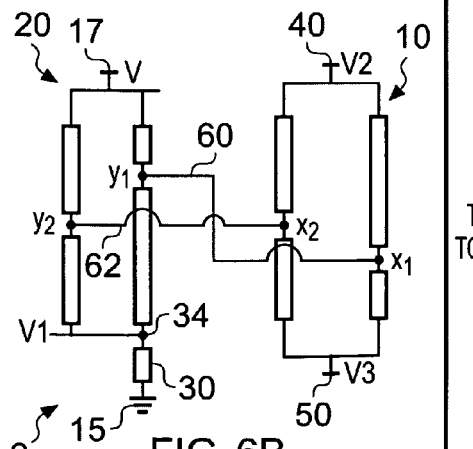
FIG. 6A     FIG. 6B

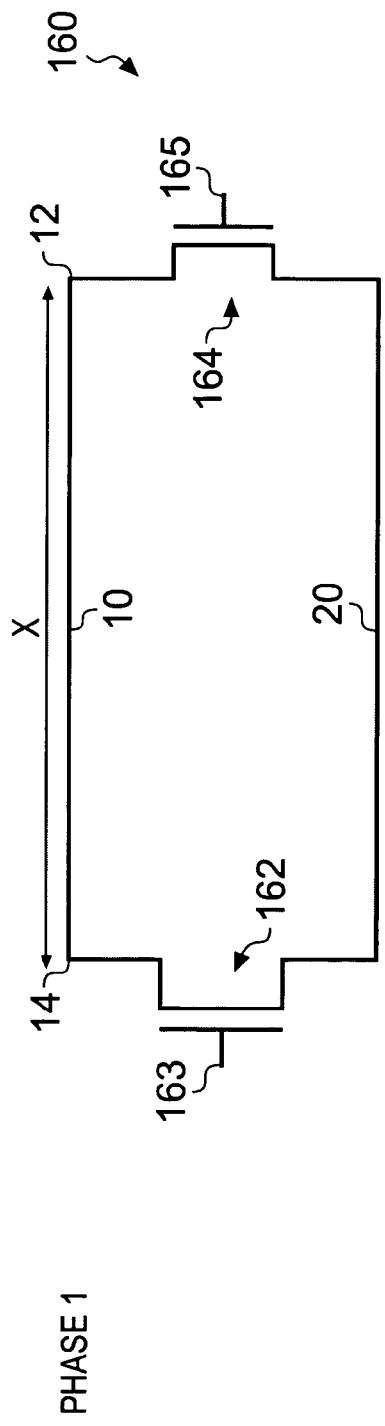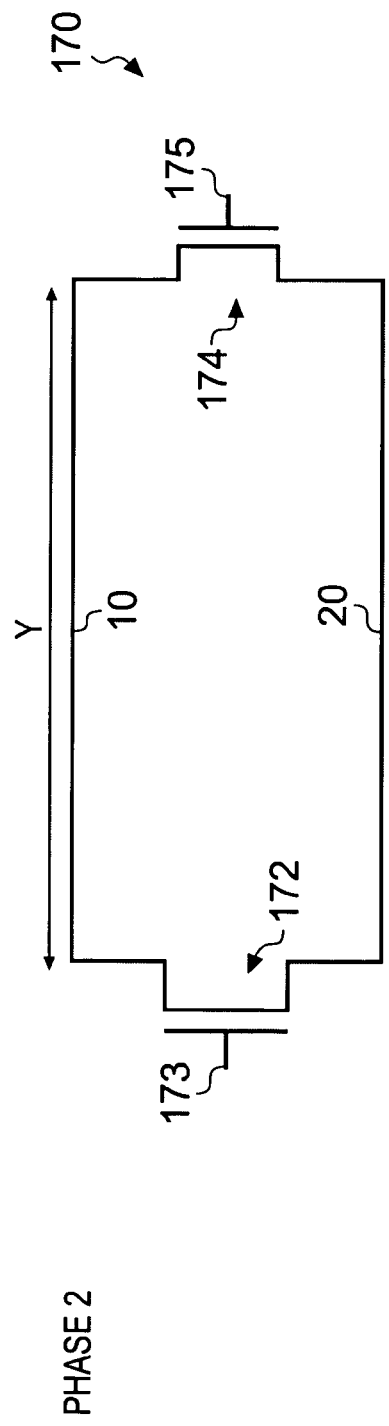

RESISTIVE TOUCH SCREEN APPARATUS, A METHOD AND A COMPUTER PROGRAM

FIELD OF THE INVENTION

Embodiments of the present invention relate to resistive touch screens. In particular, they relate to resistive touch screens for detecting dual touches.

BACKGROUND TO THE INVENTION

Touch screen apparatus that comprise two continuous resistive screens membranes such as N-wire resistive touch screens (as opposed to matrix resistive touch screens) are currently capable of locating a single touch but are not capable of locating two touches that occur at the same time.

BRIEF DESCRIPTION OF VARIOUS EMBODIMENTS OF THE INVENTION

According to various, but not necessarily all, embodiments of the invention there is provided an apparatus comprising: a first resistive screen extending in a first direction and a second direction; a second resistive screen extending in the first direction and the second direction and separated from the first resistive screen; a first reference resistor; a voltage source configured to apply a voltage across a series combination of the first reference resistor and the first resistive screen; and a voltage detector configured to measure a first voltage across the reference resistor, In use, the first voltage increases when a user touches the first resistive screen at two distinct locations creating two distinct electrical connections between the first resistive screen and the second resistive screen.

The apparatus is capable of not only locating a single touch but also capable of locating two touches that occur at the same time. This enables a user to provide input via gestures e.g. by tracing two points of contact simultaneously over the first resistive screen.

According to various, but not necessarily all, embodiments of the invention there is provided a method comprising: applying a voltage across a series combination of a first reference resistor and a first resistive screen; and measuring a first voltage across the reference resistor, wherein the first voltage increases when a user touches the first resistive screen at two distinct locations creating two distinct electrical connections between the first resistive screen and a second underlying resistive screen.

According to various, but not necessarily all, embodiments of the invention there is provided a computer program comprising instructions which when used by a controller enables the controller to: control the application of a voltage across a series combination of a first reference resistor and a first resistive screen; and detect a change in a first voltage measured across the reference resistor.

According to various, but not necessarily all, embodiments of the invention there is provided an apparatus comprising: a first resistive screen; a second resistive screen separated from the first resistive screen; first resistor means; means for applying a voltage across a series combination of the first resistor means and the first resistive screen; and means for measuring a first voltage across the reference resistor means.

BRIEF DESCRIPTION OF THE DRAWINGS

For a better understanding of various examples of embodiments of the present invention reference will now be made by way of example only to the accompanying drawings in which:

FIG. 2A schematically illustrates a configuration of an example of a two phase resistive touch screen apparatus when it is in a first phase;

FIG. 2B schematically illustrates a configuration of an example of a two phase resistive touch screen apparatus when it is in a second phase FIG. 3A schematically illustrates an example of one possible controller for the resistive touch screen apparatus;

FIG. 4A schematically illustrates an electrical configuration of an example of a touch sensitive apparatus in the first phase when there is no touch;

FIG. 4B schematically illustrates an electrical configuration of an example of a touch sensitive apparatus in the second phase when there is no touch;

FIG. 5A schematically illustrates an electrical configuration of an example of a touch sensitive apparatus in the first phase when there is a single touch;

FIG. 5B schematically illustrates an electrical configuration of an example of a touch sensitive apparatus in the second phase when there is a single touch;

FIG. 6A schematically illustrates an electrical configuration of an example of a touch sensitive apparatus in the first phase when there are dual touches;

FIG. 6B schematically illustrates an electrical configuration of an example of a touch sensitive apparatus in the second phase when there are dual touches;

FIG. 14A schematically illustrates a control mechanism configured to interconnect the first resistive screen and the second resistive screen;

FIG. 14B schematically illustrates a control mechanism configured to interconnect the first resistive screen and the second resistive screen.

DETAILED DESCRIPTION OF VARIOUS EMBODIMENTS OF THE INVENTION

Figure 1:
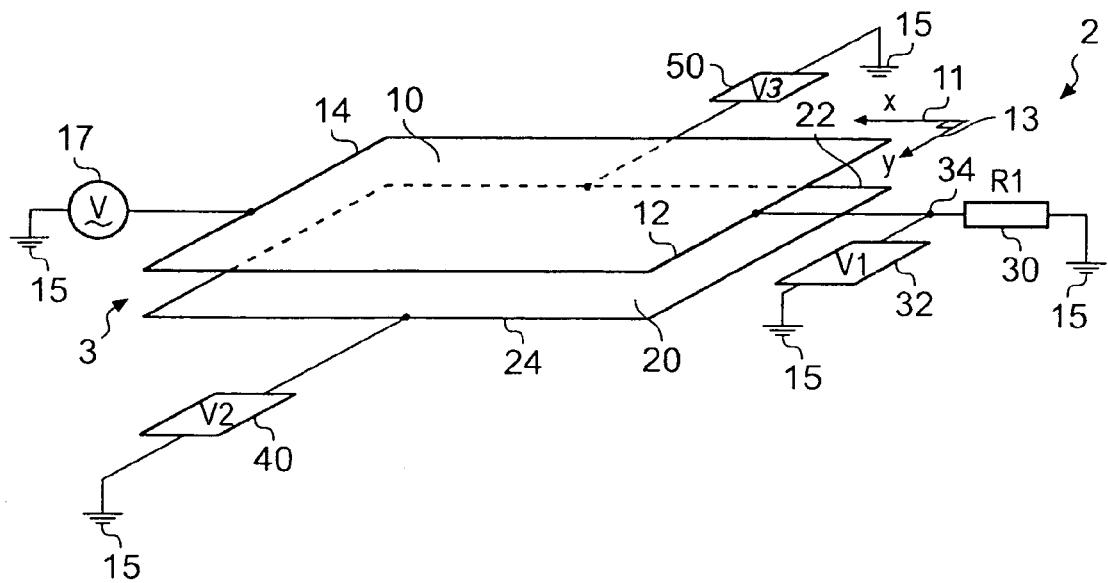
FIG. 1 schematically illustrates a resistive touch screen apparatus.

The Figs schematically illustrates an apparatus 2 comprising: a first resistive screen 10 extending in a first direction 11 and a second direction 13; a second resistive screen 20 extending in the first direction 11 and the second direction 13 and separated from the first resistive screen 10; a first reference resistor 30; a voltage source 17 configured to apply a voltage V across a series combination of the first reference resistor 30 and the first resistive screen 10; and a voltage detector 32 configured to measure a first voltage V1 across the reference resistor 30.

In use, the first voltage V1 may increase when a user touches the first resistive screen 10 at two distinct locations (x1, y1), (x2, y2) creating two distinct electrical connections 60, 62 between the first resistive screen 10 and the second resistive screen 20.

FIG. 1 schematically illustrates a resistive touch screen apparatus 2. In this example, the touch screen apparatus 2 is configured as a so called 4-wire resistive touch screen apparatus.

The resistive touch screen apparatus 2 comprises: a first resistive screen 10; a second resistive screen 20; a first reference resistor 30; a voltage source 17; a first voltage detector 32, a second voltage detector 40 and a third voltage detector 50.

The first resistive screen 10 is substantially planar when untouched and extends over a first area in a first x-direction 11 and a second y-direction 13, which is orthogonal to the first x-direction 11. The second resistive screen 20 is substantially planar and also extends over a second area in the first x-direction 11 and the second y-direction 13. The second area underlies the first area and the first resistive screen 10 and the second resistive screen 20 are separated by a gap 3. When a user touches the first resistive screen 10, the first resistive screen 10 flexes and contacts the second resistive screen 20. The opposing sides of the first resistive screen 10 and the second resistive screen 20 are coated with an electrically conductive (and resistive) material which form a temporary electrical interconnection where they meet. The coating on the opposing sides of the first resistive screen 10 and the second resistive screen 20 may be uniform and continuous without patterning. The continuity and uniformity enables linear voltage gradients to be developed across the opposing sides of the first resistive screen 10 and the second resistive screen 20.

The first resistive screen 10 has a first extremity 12 in the first x-direction 11 and a second extremity 14 in the first x-direction 11 to which the conductive material is connected.

The second resistive screen 20 has a first extremity 22 in the second y-direction 13 and a second extremity 24 in the second y-direction 13 to which the conductive material is connected.

In the configuration illustrated, which corresponds to a first phase described with reference to FIGS. 2A and 2B, a voltage source 17 is configured to apply a voltage V to the second extremity 14 of the first resistive screen 10. A first reference resistor 30 having a value R1 is connected between ground 15 and a node 34. The node 34 is connected to the first extremity 12 of the first resistive screen 10. The node 34 is also connected to ground 25 via a first voltage detector 32. The first voltage detector 32 has a very high input impedance and therefore draws negligible electric current. The first voltage detector 32 therefore measures the first voltage V1 developed across the first reference resistor 30.

The voltage source 17 therefore applies a voltage V across a series combination of the first reference resistor 30 and the first resistive screen 10.

The second voltage detector 40 is connected between the second extremity 24 of the second resistive screen 20 and ground 15. The second voltage detector 40 measures a second voltage V2. The second voltage detector 40 has a very high input impedance and therefore draws negligible electric current.

The third voltage detector 50 is connected between the first extremity 22 of the second resistive screen 20 and ground 15. The third voltage detector 50 measures a third voltage V3. The third voltage detector 50 has a very high input impedance and therefore draws negligible electric current.

The size R1 of first reference resistor 30 is small in comparison to the resistance Rx of the first resistive screen 10 in the first x-direction 11. The first reference resistor 30 may have a magnitude at least one order of magnitude less than the resistance of the first resistive screen 10 in the first x-direction 11 i.e. R1<Rx.

The configuration illustrated in FIG. 1 is suitable for resolving the location of a user's touch to the first resistive screen 10 in the first x-direction 11 but needs to be reconfigured for resolving the location of the user's touch to the first resistive screen in the second y-direction 13. FIG. 4A illustrates a configuration of the touch sensitive apparatus 2 that allows the configuration of the apparatus 2 to be rapidly changed between the configuration illustrated in FIG. 4A which resolves in a first phase the location of a user's touch to the first resistive screen 10 in the first x-direction 11 and the configuration illustrated in FIG. 4B which resolves in a second phase the location of a user's touch to the first resistive screen 10 in the second y-direction 13.

A series of switches S1-S7 controlled by a controller 4 are used to change the configuration of the apparatus. The positions of the switches are toggled by the controller 4. The first voltage detector 32 measures a voltage V1 across the reference resistor 30. The same references resistor 30 is used, in this exemplary implementation for both the first phase and the second phase.

In a first phase of a measurement event, the switches have the positions illustrated in FIG. 4A. The configuration illustrated in FIG. 4A corresponds to the configuration illustrated in and described with reference to FIG. 1.

The voltage source 17 is connected via a switch S1 and switch S4 to the second extremity 14 of the first resistive screen 10. The reference resistor 30 is connected via a switch S8 and switch S6 to the first extremity 12 of the first resistive screen 10. The voltage source 17 is configured to apply a voltage V across a series combination of the first reference resistor 30 and the first resistive screen 10.

The second voltage detector 40 is connected via a switch S2 and switch S3 to the second extremity 24 of the second resistive screen 20. The third voltage detector 50 is connected via a switch S5 and a switch S7 to the first extremity of the second resistive screen 20.

In a second phase of a measurement event, the switches have the positions illustrated in FIG. 4B.

The voltage source 17 is connected via the switch S1 and the switch S3 to the second extremity 24 of the second resistive screen 20. The reference resistor 30 is connected via a switch S8 and switch S5 to the first extremity 22 of the second resistive screen 10. The voltage source 17 therefore applies a voltage across a series combination of the reference resistor 30 and the second resistive screen 20.

The second voltage detector 40 is connected via a switch S2 and switch S4 to the second extremity of the first resistive screen 10. The third voltage detector 50 is connected via a switch S7 and a switch S6 to the first extremity of the first resistive screen 10.

The controller 4, which may be part of the resistive touch screen apparatus 2, produces switch control signals SC which control the positions of the switches. In a first phase, the switches are set as illustrated in FIG. 2A and in a second phase the switches are set as illustrated in FIG. 2B. The controller 4 produces a voltage control signal VC which controls when the voltage source 15 provides the voltage V.

The controller 4 receives the voltage V1 measured by the first voltage detector 30, the voltage V2 measured by the second voltage detector 40 and the voltage V3 measured by the third voltage detector 50.

The size of first reference resistor R1 is small in comparison to the resistance Rx of the first resistive screen 10 and a resistance Ry of the second resistive screen 20.

The first reference resistor 30 may have a magnitude at least one order of magnitude less than the lower of the resistance of the first resistive screen 10 and the resistance of the second resistive screen 10 i.e. R1<Rx and R1<Ry.

Although a common reference resistor 30 has been used for the first phase (FIG. 2A) and the second phase (FIG. 2B), in other implementations a first reference resistor may be used for the first phase and a second different reference resistor may be used for the second phase.

Implementation of controller 4 can be in hardware alone (a circuit, a processor . . . ), have certain aspects in software including firmware alone or can be a combination of hardware and software (including firmware).

The controller 4 may be implemented using instructions that enable hardware functionality, for example, by using executable computer program instructions 3 in a general-purpose or special-purpose processor 6 that may be stored on a computer readable storage medium 8, 5 (disk, memory etc) to be executed by such a processor 6.

Figure 3A:
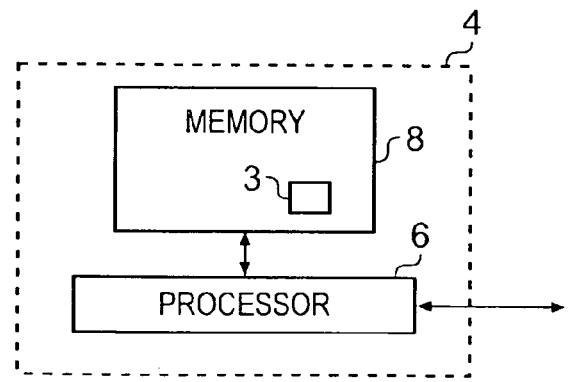
FIG. 3B schematically illustrates a delivery mechanism for a computer program.

Referring to FIG. 3A which illustrates one of many possible implementations of the controller 4, a processor 6 is configured to read from and write to the memory 8. The processor 6 may also comprise an output interface via which data and/or commands are output by the processor 6 and an input interface via which data and/or commands are input to the processor 6.

The memory 8 stores a computer program 3 comprising computer program instructions that control the operation of the apparatus 2 when loaded into the processor 6. The computer program instructions 3 provide the logic and routines that enables the apparatus to perform the methods illustrated in the Figs. The processor 6 by reading the memory 8 is able to load and execute the computer program 3.

Figure 3B:
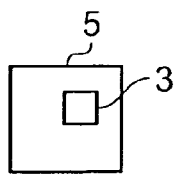

The computer program may arrive at the apparatus 2 via any suitable delivery mechanism 5 as schematically illustrated in FIG. 3B. The delivery mechanism 5 may be, for example, a computer-readable storage medium, a computer program product, a memory device, a record medium such as a CD-ROM or DVD, an article of manufacture that tangibly embodies the computer program 3. The delivery mechanism may be a signal configured to reliably transfer the computer program 3. The apparatus 2 may propagate or transmit the computer program 3 as a computer data signal.

Although the memory 8 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In FIGS. 4A-6B, the reference 'A' is used to denote the first phase and the reference 'B' is used to denote the second phase. The numeral 4 in the FIG. reference is used to designate when there is no touch by a user, the numeral 5 in the FIG. reference is used to designate when there is a single touch by a user of the first resistive panel 10, and the numeral 5 in the FIG. reference is used to designate when there are two touches by a user of the first resistive panel 10.

In the following description, the following naming convention will be used. As the first phase resolves the first x-direction 11, the voltages measured in the first phase will be referenced by _x. As the second phase resolves the second y-direction 13, the voltages measured in the second phase will be referenced by _y.

FIG. 4A schematically illustrates the configuration of the apparatus 2 when there is no touch and the controller 4 is in the first phase. A voltage V_x is applied by the voltage source 17. The current flow through the reference resistor 30 is at a minimum I_min_x and the first voltage across the reference resistor 30 is at a minimum V1_min_x where:

$$I\_min\_x = V1\_min\_x/R1$$

&

$$I\_min\_x = (V\_x - V1\_min\_x)/Rx;$$

resolving gives:

$$Rx = (V\_x - V1\_min\_x).R1/V1\_min\_x$$

Therefore the controller 4 can calculate the resistance Rx, where Rx is the resistance of a full dimension X of the first resistive screen 10 in the first x-direction 11.

FIG. 4B schematically illustrates the configuration of the apparatus 2 when there is no touch and the controller 4 is in the second phase. A voltage V_y is applied by the voltage source 17. The current flow through the reference resistor 30 is at a minimum I_min_y and the first voltage across the reference resistor 30 is at a minimum V1_min_y where:

$$I\_min\_y = V1\_min\_y/R1$$

&

$$I\_min\_y = (V\_y - V1\_min\_y)/Ry;$$

resolving gives:

$$Ry = (V\_y - V1\_min\_y).R1/V1\_min\_y$$

Therefore the controller 4 can calculate the resistance Ry, where Ry is the resistance of a full dimension Y of the second resistive screen 20 in the second y-direction 13.

FIG. 5A schematically illustrates the configuration of the apparatus 2 when there is a single touch and the controller 4 is in the first phase. A first electrical connection 60 is made between the first resistive screen 10 and the second resistive screen 20.

The high input impedances of the second voltage detector 40 and the third voltage detector 50 prevent current flow in the second resistive screen 20. A linear circuit is formed with no current loops in the second resistive screen 20. As there is only one current path between the contact point (x1, y1) and the measurement points 22, 24 there is a linear relationship between the measured voltages V2, V3 and the x-position of the contact point.

$$V2\_x=V3\_x=(V\_x-V1\_x).x1/X=I\_x.Rx.x1/X$$

$$x1/X=V2\_x./I\_x.Rx=V2\_x.R1./V1\_x.Rx$$

Therefore the controller 4 can calculate x1 as a proportion of X, the dimension of the first resistive screen 10 in the x-direction.

FIG. 5B schematically illustrates the configuration of the apparatus 2 when there is a single touch and the controller 4 is in the second phase.

$$V2\_y=V3\_y=(V\_y-V1\_y).y1/Y=I\_min\_y.Ry.y1/Y$$

$$y1/Y=V2\_y./I\_min\_y.Ry=V2\_y.R1/V1\_y.Ry$$

Therefore the controller 4 can calculate y1 as a proportion of Y, the dimension of the second resistive screen 20 in the y-direction.

FIG. 6A schematically illustrates the configuration of the apparatus 2 when there are two touches and the controller 4 is in the first phase. FIG. 6B schematically illustrates the configuration of the apparatus 2 when there are two touches and the controller 4 is in the second phase. In addition to the first electrical connection 60 between the first resistive screen 10 and the second resistive screen 20, an additional second electrical connection 62 is made between the first resistive screen 10 and the second resistive screen 20.

Although the high input impedances of the second voltage detector 40 and the third voltage detector 50 prevent current flow into them, current loops may be formed within the first resistive screen 10 and the second resistive screen 20. As there are more than one current path between the respective contact points (x1, y1) (x2, y2) and the measurement points of the voltages V2 and V3, there is a complex non-linear relationship between the measured voltages V2, V3 and positions of the contact points.

It is not a simple matter to determine quantitatively the locations of the contact points (x1, y1) and (x2, y2). There is no simple conversion possible of voltage measured to distance.

It should, however, be noted that the second touch introduces resistances in parallel to the resistive screen across which voltage is applied which will necessarily reduce the impedance of the resistive screen resulting in a higher current. The first voltage V1 would therefore be expected to be larger when there are two touches compared with when there is a single touch.

Figure 7:
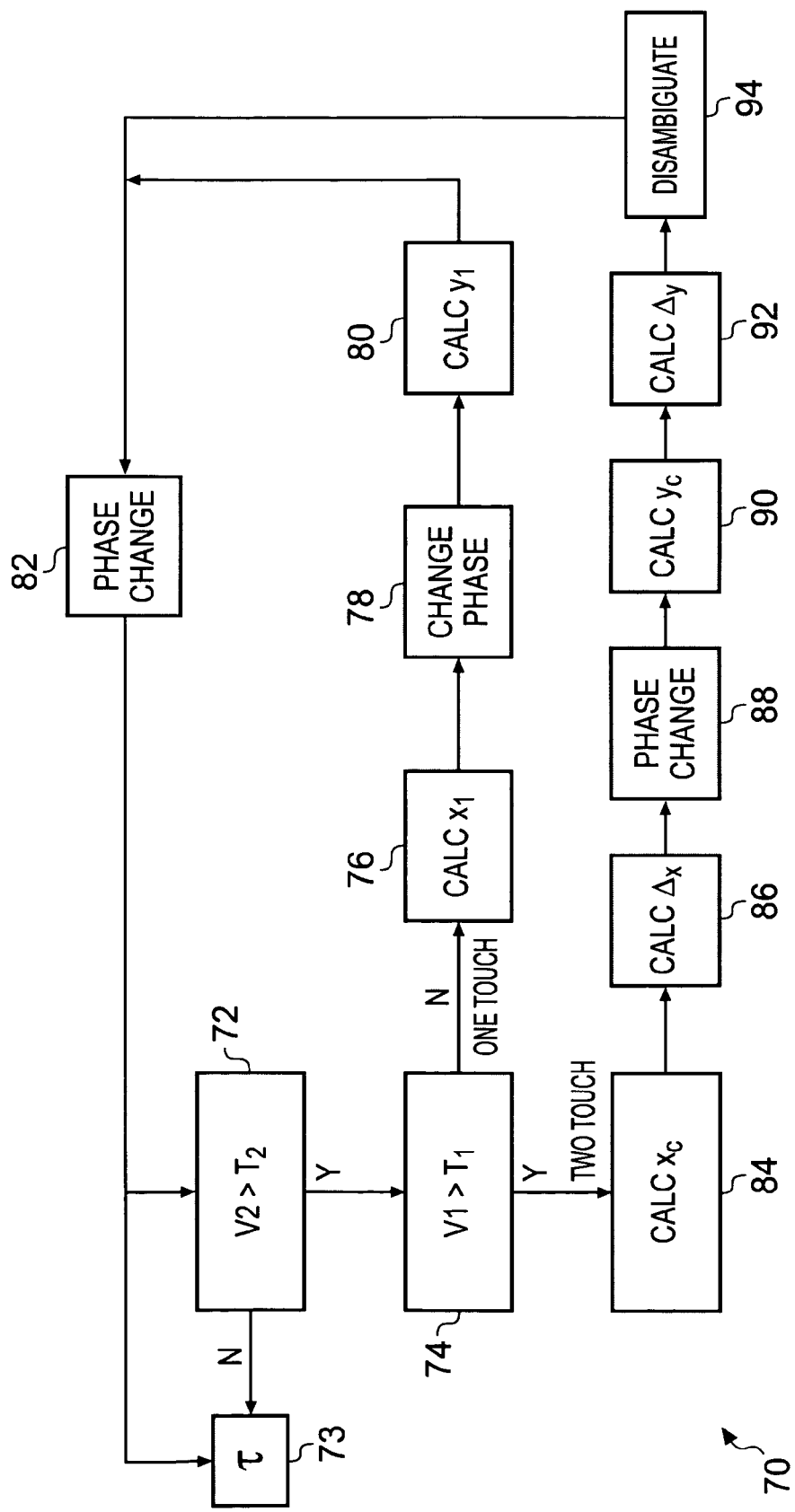
FIG. 7 schematically illustrates a process for determining a position of a single touch and for estimating the positions of dual touches.

FIG. 7 schematically illustrates a process 70 that may be performed by the controller 4 to determine a position (x1, y1) for one touch and to estimate the positions (x1, y1) and (x2, y2) for two touches.

At block 72 it is determined whether the second voltage V2 (or the third voltage V3) is greater than a predetermined threshold value T2.

If the second voltage V2 (or third voltage V3) is less than the threshold value there is no touch detected. After a delay τ introduced at block 73, the process 70 restarts.

If the second voltage V2 (or third voltage V3) is greater than the threshold value there is one or more touches detected. The process moves to block 74.

At block 74 it is determined whether the first voltage V1 is greater than a predetermined threshold value T1.

If the first voltage V1 is less than the threshold value T1 there is a single touch detected. The process moves to block 76 representing the first block of a one-touch mode of operation in which the controller calculates the position (x1, y1) of the singe touch.

If the first voltage V1 is greater than the threshold value T1 there is a dual touch detected. The process moves to block 84 representing the first block of a two-touch mode of operation in which the controller 4 calculates estimates of the positions (x1, y1) (x2, y2) of the two touches.

Single Touch Mode

At block 76, the controller 4 can calculate x1 as a proportion of X, the dimension of the first resistive screen 10 in the x-direction 11.

The controller 4 may, for example, use the following relationship:

$$x1/X=V2\_x./I\_x.Rx=V2\_x.R1./V1\_min\_x.Rx$$

In this relationship, x1 is proportional to the voltage V2 (or V3 which is the same value as V2) and inversely proportional to the voltage developed across the first resistive screen 10.

The value of R1 is known and fixed. The values of V2 and V1 are measured. The value of Rx is previously calculated in the manner described with reference to FIG. 4A.

At block 78, the controller changes phase and then at block 80 the controller 4 calculates y1 as a proportion of Y, the dimension of the second resistive screen 20 in the y-direction 13.

The controller 4 may, for example, use the following relationship:

$$y1/Y=V2\_y./I\_min\_y.Ry=V2\_y.R1/V1\_min\_y.Ry$$

In this relationship, y1 is proportional to the voltage V2 (or V3 which is the same value as V2) and inversely proportional to the voltage developed across the second resistive screen 20.

The value of R1 is known and fixed. The values of V2 and V1 are measured. The value of Ry is previously calculated in the manner described with reference to FIG. 4B.

The phase of the controller is then changed back at block 82 and the process 70 restarts.

Dual Touch Mode

At block 84 the controller 4 calculates a centre location ($x_c$) in the x-direction which represents a location midway between the two locations in the x-direction x1, x2 at which the first resistive screen 10 is being simultaneously touched.

Figure 10:
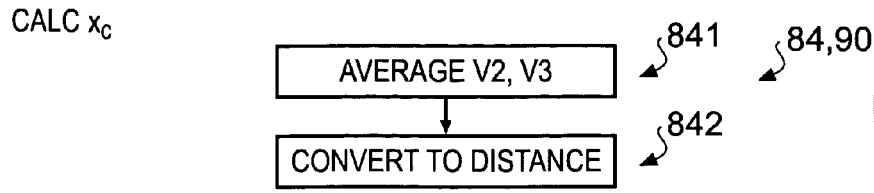
FIG. 10 schematically illustrates a process for calculating a centre location.

Referring to FIG. 10, the controller 4 first calculates the centre location $x_c$ by averaging the second voltage and the third voltage at block 841 and then converting the average to a distance at block 842.

Block 42 may for example perform the following calculation:

$$x_c/X=[\tfrac{1}{2}(V2\_x+V3\_x)-V1\_x]/Vd\_x$$

where $Vd\_x=V-V1\_x=.Rx.I\_x=Rx.V1\_x/R1$

In this relationship, $x_c$ is proportional to the average of V2 and V3 and inversely proportional to the voltage developed across the first resistive screen 10.

Next, at block 86 the controller 4 calculates a displacement Δx from the centre location ($x_c$) in the x-direction which represents a magnitude of the displacement of the two touch locations in the x-direction (x1, x2) from the centre location $x_c$.

Figure 12A:
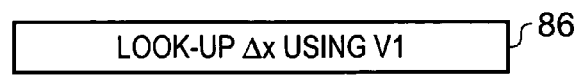
FIGS. 12A and 12B schematically illustrate processes for calculating displacements from the centre location.

Referring to FIG. 12A, the controller 4 at block 86 uses the measured first voltage V1 to look-up Δx from a look-up table.

Values in the look-up table can be pre-programmed, updated on the fly during use or, for example, as described with reference to FIG. 11 below.

The value of Δx a for different values of V1 may be calculated according to the relationship:

$$\Delta x/X = (V1\_x - V1\_\min\_x)/(V1\_\max\_x - V1\_\min\_x)$$

In this relationship, Δx is proportional to the first voltage V1_x (or more precisely the increase in V1_x from its minimum value V1_min_x) and inversely proportional to the range of the first voltage V1_x.

Figure 8A:
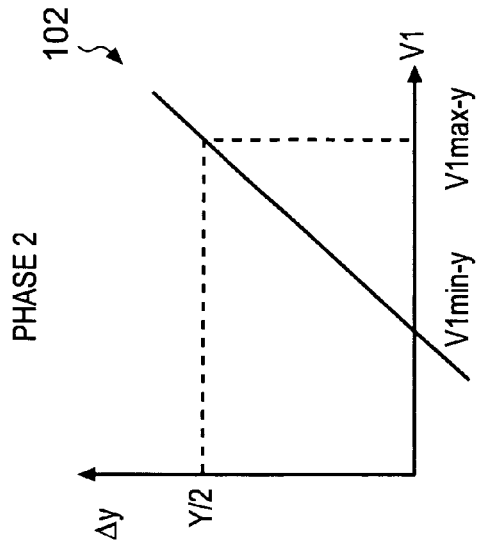
FIG. 8A graphically illustrates an assumed linear relationship between the deviation $\Delta x$ and a first voltage across a reference resistor.

This relationship is graphically illustrated in FIG. 8A which illustrates the assumed linear relationship between the deviation Δx and the first voltage V1_x.

Next at block 88 the controller changes to the second phase.

Then at block 90 the controller 4 calculates a centre location ($y_c$) in the y-direction which represents a location midway between the two locations in the y-direction y1, y2 at which the first resistive screen 10 is being simultaneously touched.

Referring to FIG. 10, the controller 4 first calculates the centre location $y_c$ by averaging the second voltage and the third voltage at block 841 and then converting the average to a distance at block 842.

Block 42 may for example perform the following calculation:

$$y_c/X = [\tfrac{1}{2}(V2\_y + V3\_y) - V1\_y]/Vd\_y$$

where $Vd\_y = V - V1\_y = Ry.I\_y = Ry.V1\_y/R1$

In this relationship, $y_c$ is proportional to the average of V2 and V3 and inversely proportional to the voltage developed across the second resistive screen 20.

Next, at block 92 the controller 4 calculates a displacement Δy from the centre location ($y_c$) in the y-direction which represents a magnitude of the displacement of the two touch locations in the y-direction (y1, y2) from the centre location $y_c$.

Figure 12B:
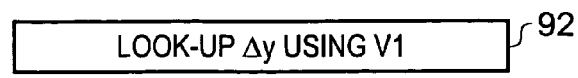

Referring to FIG. 12B, the controller 4 at block 92 uses the measured first voltage V1 to look-up Δy from a look-up table.

The value of Δy for different values of V1 may be calculated according to the relationship:

$$\Delta y/Y = (V1\_y - V1\_\min\_y)/(V1\_\max\_y - V1\_\min\_y)$$

In this relationship, Δy is proportional to the first voltage V1_y (or more precisely the increase in V1_y from its minimum value V1_min_y) and inversely proportional to the range of the first voltage V1_y.

Figure 8B:
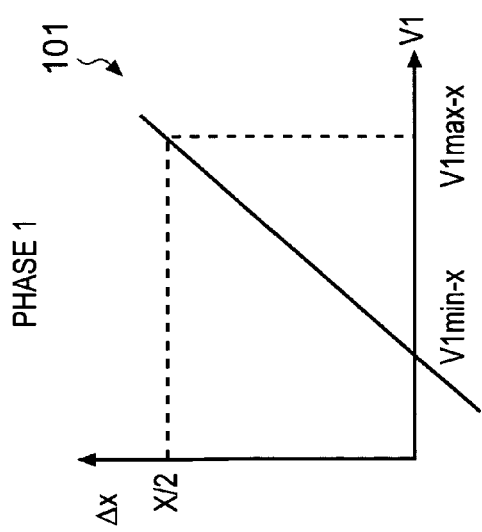
FIG. 8B graphically illustrates an assumed linear relationship between the deviation $\Delta y$ and a first voltage across a reference resistor.

This relationship is graphically illustrated in FIG. 8B which illustrates the assumed linear relationship between the deviation Δy and the first voltage V1_y.

Figure 11:
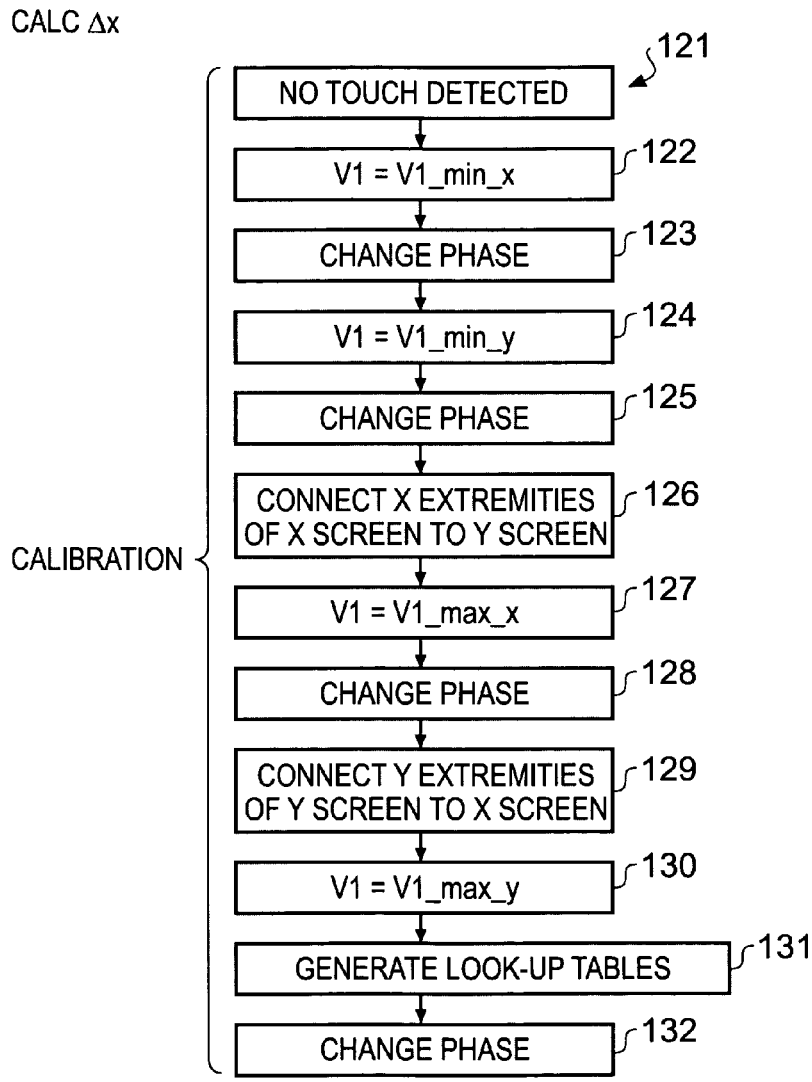
FIG. 11 schematically illustrates an example of a pre-calibration process used to enable calculation of displacements from the centre location.

FIG. 11 schematically illustrates a method for calibrating the controller 4 so that it can calculate Δx and Δy.

The calibration process involves the determination of: V1_min_x, V1_max_x, V1_min_y and V1_max_y. One example of such a calibration process is illustrated in FIG. 11.

At block 121, no touch is detected. This may be achieved in a manner similar to block 72 in FIG. 7.

The controller 4 is in the first phase and at block 122 the voltage V1 is stored as V1_min_x i.e. the minimum value of V1 for the first phase.

The controller 4 then changes the phase at block 123 to the second phase.

The controller 4 is then in the second phase and at block 124 the voltage V1 is stored as V1_min_y i.e. the minimum value of V1 for the second phase.

The controller 4 then changes the phase at block 125 to the first phase.

Then at block 126 the first resistive screen 10 and the second resistive screen are interconnected in the region of the first extremity 12 of the first resistive screen 10 and in the region of the second extremity 14 of the first resistive screen 20.

This form of interconnection maximizes the current through the first resistive screen 10 and the first voltage developed across the reference resistor 30.

The interconnection may be achieved manually by touching the first resistive screen 10 at its extreme edges in the first x-direction 11. Alternatively, the controller 4 may electronically control the interconnection of the first resistive screen 10 and the second resistive screen 20.

One example of a suitable control mechanism 160 configured to interconnect the first resistive screen 10 and the second resistive screen 20 is illustrated in FIG. 14A. A first switch 164 such as a field effect transistor (FET) is used to open and close a current path between the first extremity 12 of the first resistive screen 10 and an extremity of the second resistive screen in the x-direction. The controller 4 provides a control signal 165 to switch the FET 164 on. A second switch 162 such as a field effect transistor (FET) is used to open and close a current path between the second extremity 14 of the first resistive screen 10 and an extremity of the second resistive screen in the x-direction. The controller 4 provides a control signal 163 to switch the FET 162 on.

While the first resistive screen 10 and the second resistive screen are interconnected in the region of the first extremity 12 of the first resistive screen 10 and in the region of the second extremity 14 of the first resistive screen 10, the first voltage V1 is stored at block 127 as V1_max_x i.e. the maximum value of V1 in the first phase.

The controller 4 then changes the phase at block 128 to the second phase.

Then at block 129 the first resistive screen 10 and the second resistive screen are interconnected in the region of the first extremity 22 of the second resistive screen 20 and in the region of the second extremity 24 of the second resistive screen 20. This form of interconnection maximizes the current through the second resistive screen 20 and the first voltage developed across the reference resistor 30.

The interconnection may be achieved manually by touching the first resistive screen 10 at its extreme edges in the second y-direction 13. Alternatively, the controller 4 may electronically control the interconnection of the first resistive screen 10 and the second resistive screen 20.

One example of a suitable control mechanism 170 configured to interconnect the first resistive screen 10 and the second resistive screen 20 is illustrated in FIG. 14B. A first switch 174 such as a field effect transistor (FET) is used to open and close a current path between the first extremity 22 of the second resistive screen 20 and an extremity of the first resistive screen in the y-direction. The controller 4 provides a control signal 175 to switch the FET 164 on. A second switch 172 such as a field effect transistor (FET) is used to open and close a current path between the second extremity 24 of the second resistive screen 20 and an extremity of the first resistive screen 10 in the y-direction. The controller 4 provides a control signal 173 to switch the FET 172 on.

While the first resistive screen 10 and the second resistive screen are interconnected in the region of the first extremity 22 of the second resistive screen 20 and in the region of the second extremity 24 of the second resistive screen 20, the first voltage V1 is stored at block 130 as V1_max_y i.e. the maximum value of V1 in the second phase.

At block 131 the controller 4 uses the relationships:

$$\Delta x/X = (V1\_x - V1\_\min\_x)/(V1\_\max\_x - V1\_\min\_x)$$

$$\Delta y/Y = (V1\_y - V1\_\min\_y)/(V1\_\max\_y - V1\_\min\_y)$$

to generate values in a look-up table for Δx used in block 86 and to generate values in a look-up table for Δy used in block 92.

In these relationships, Δx is proportional to the first voltage V1_x (or more precisely the increase in V1_x from its minimum value V1_min_x) and inversely proportional to the range of the first voltage V1_x and Δy is proportional to the first voltage V1_y (or more precisely the increase in V1_y from its minimum value V1_min_x) and inversely proportional to the range of the first voltage V1_y.

Finally at block 132, the controller returns to the first phase.

Figure 9A:
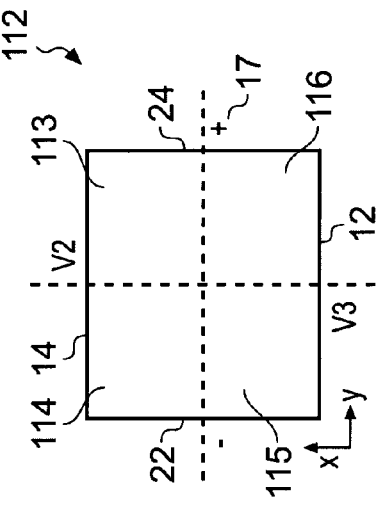
FIG. 9A schematically illustrates an example of disambiguation of possible locations for the dual touches in the first phase.
Figure 9B:
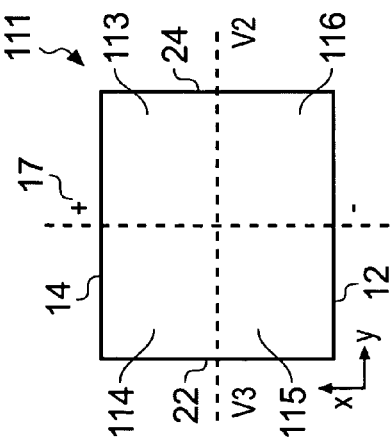
FIG. 9B schematically illustrates an example of disambiguation of possible locations for the dual touches in the second phase.

Returning to the description of FIG. 7, the controller 4 having determined $x_c$, $y_c$, Δx, Δy needs to disambiguate between possible locations for the two touches. Disambiguation 111 for the first phase is schematically illustrated in FIG. 9A. Disambiguation 112 for the second phase is schematically illustrated in FIG. 9B.

In the first phase, as illustrated in FIG. 9A, the voltage at the second extremity 14 of the first resistive screen 10 V(x=X) is greater than the voltage at the first extremity 12 of the first resistive screen 10 V(x=0). The locations of the two touches can be determined from the relationship between voltage V2 at the second extremity 24 of the second resistive screen 20 and the voltage V3 at the first extremity 22 of the second resistive screen 20.

In the first phase, when V2>V3:
one touch location is: $(x_c+\Delta x, y_c+\Delta y)$ in the first quadrant 113
another touch location is: $(x_c-\Delta x, y_c-\Delta y)$ in the third quadrant 115

In the first phase, when V2<V3
one touch location is: $(x_c+\Delta x, y_c-\Delta y)$ in the fourth quadrant 116
another touch location is: $(x_c-\Delta x, y_c+\Delta y)$ in the second quadrant In the second phase, as illustrated in FIG. 9B, the voltage at the second extremity 24 of the second resistive screen 20 V(y=Y) is greater than the voltage at the first extremity 22 of the second resistive screen 20 V(y=0). The locations of the two touches can be determined from the relationship between the voltage V2 at the second extremity 14 of the first resistive screen 10 and the voltage V3 at the first extremity 12 of the first resistive screen 10.

In the second Phase, when V2>V3:
One touch location is: $(x_c+\Delta x, y_c+\Delta y)$ in the first quadrant 113
Another touch location is: $(x_c-\Delta x, y_c-\Delta y)$ in the third quadrant 115

In the second Phase, when V3>V2:
One touch location is: $(x_c+\Delta x, y_c-\Delta y)$ in the fourth quadrant 116
Another touch location is: $(x_c-\Delta x, y_c+\Delta y)$ in the second quadrant 114.

It will therefore be appreciated that irrespective of phase, if V2>V3 the touch locations are $(x_c+\Delta x, y_c+\Delta y)$ & $(x_c-\Delta x, y_c-\Delta y)$ else the touch locations are $(x_c+\Delta x, y_c-\Delta y)$ & $(x_c-\Delta x, y_c+\Delta y)$.

The controller 4 in block 94 is therefore able to disambiguate the locations of the touches by comparing the second voltage V2 and the third voltage V3.

Figure 13:
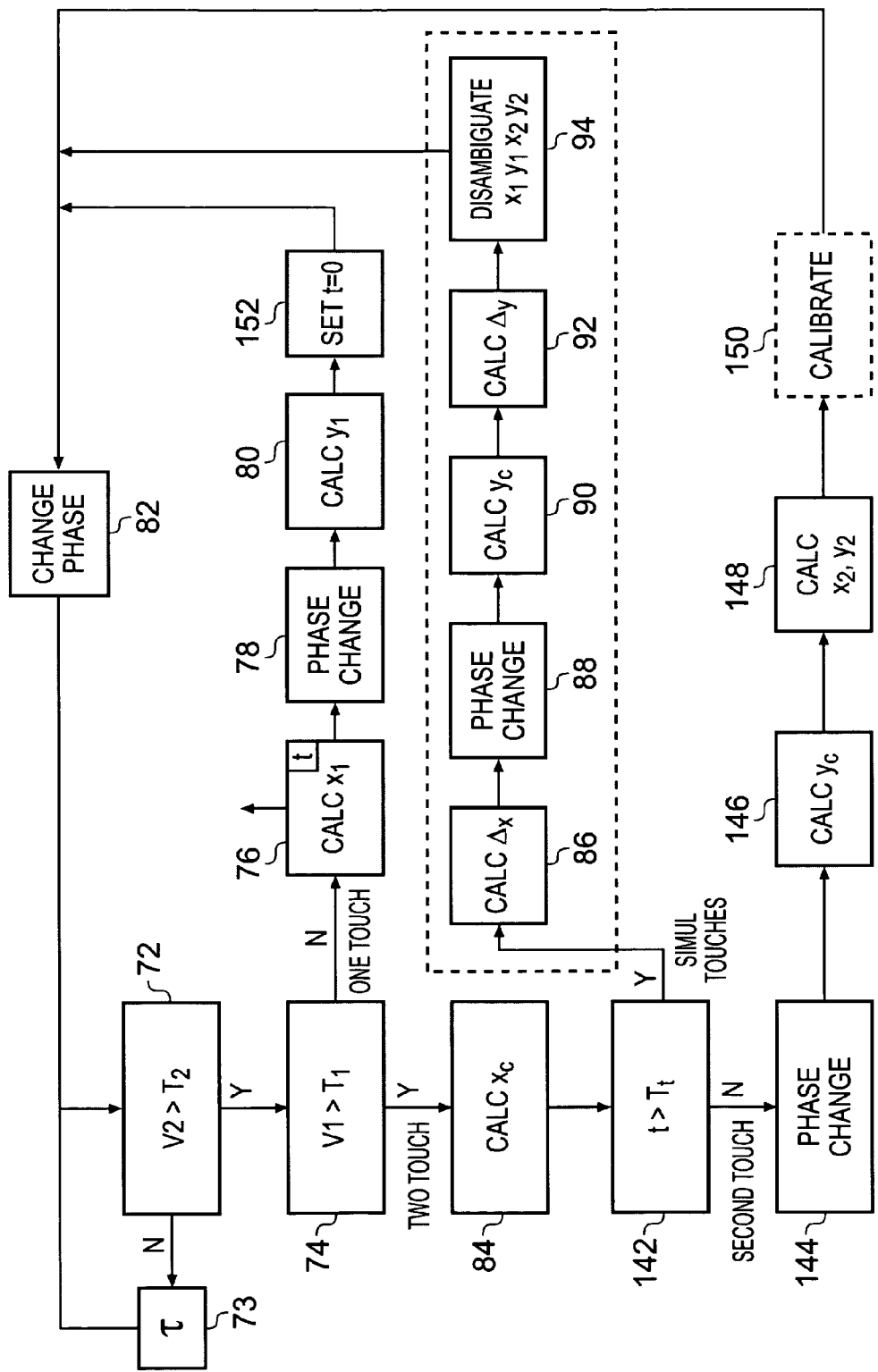
FIG. 13 schematically illustrates a process that locates dual touches when the first touch momentarily precedes the second touch.

The process illustrated in FIG. 13 is similar to the process 70 illustrated in FIG. 7. However, the process illustrated in FIG. 13 illustrates an additional process for locating two touches when the first touch momentarily precedes the second touch.

The first touch causes the controller to enter the one-touch mode and it processes blocks 72, 74, 76, 78 and 80 as described previously with reference to FIG. 7.

Then at block 152 the controller 4 resets a timer t at t=0.

The second touch causes the controller 4 to processes blocks 72, 74, 84 as described previously with reference to FIG. 7. Then at block 142 it compares the current value of the timer t with a threshold value.

If the value of the timer is less than the threshold because the second touch quickly follows the first touch it is assumed that the first touch and the second touch are a dual touch unintentionally separated in time. The process then moves to block 144.

If the value of the timer is greater than the threshold, then it is assumed that a dual touch distinct from the first touch has occurred. The controller 4 then proceeds as described previously with reference to FIG. 7 and processes blocks 86, 88, 90, 92 and 94 to determine the locations of the dual touch.

At block 144, the controller changes phase and then calculates a centre location $(y_c)$ in the y-direction. This process is similar to that at block 90.

The controller then at block 148 calculates the location (x2, y2) of the second touch from the centre location $(x_c, y_c)$ and the location (x1, y1) of the first touch. The location (x2, y2) of the second touch is a 180 degree rotation of the location (x1, y1) of the first touch about the centre location $(x_c, y_c)$ e.g. x2=2. $x_c$-x1, y2=2. $y_c$-y1

There is therefore a process 140 comprising blocks 86, 88, 90, 92 and 94 which is suitable for determining the locations of two touches while they are simultaneously active.

There is also a process comprising blocks 144, 146, 148 which is suitable for determining the locations of two touches where the second touch quickly follows the other.

It is of course possible for two touches to be such that the second touch quickly follows the first and also such that the two touches are then simultaneously active. In this situation, it is possible to determine the two locations of the two touches using blocks 76, 80, 148 and also using block 94 and then to compare the two results. If there is divergence, then the controller may initiate a recalibration process. The recalibration process may, for example, perform the method of FIG. 11.

Where components are described as 'connected' or 'coupled' or 'interconnected', depending upon context, this may mean that the components are operationally coupled and any number or combination of intervening elements can exist (including no intervening elements).

Figure 15A:
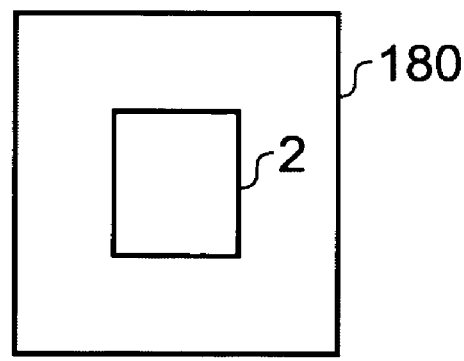
FIG. 15A, schematically illustrates a module comprising a resistive touch screen apparatus.
Figure 15B:
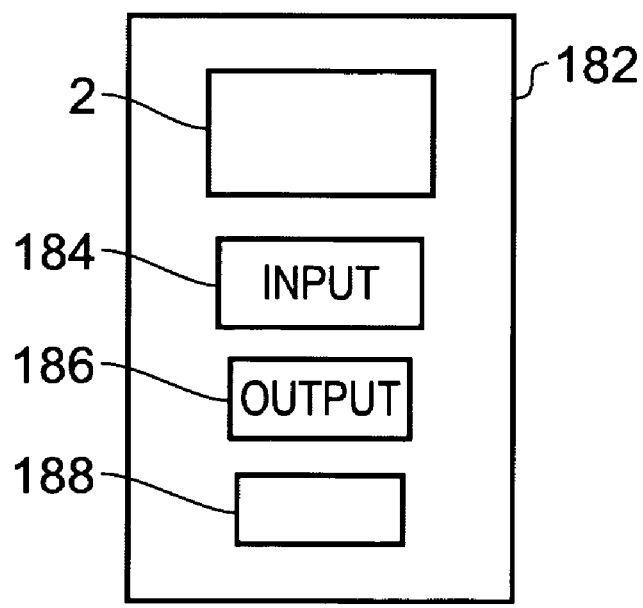
FIG. 15B, schematically illustrates an electronic device comprising a resistive touch screen apparatus.

Different implementations of the apparatus 2 are schematically illustrated in FIGS. 15A and 15B.

In FIG. 15A, the apparatus 2 is part of a module 180. As used here 'module' refers to a unit or apparatus that excludes certain parts/components that would be added by an end manufacturer or a user.

In the module 180 the controller 4 may be provided as an integral part of the resistive touch screen apparatus 2 (as illustrated) or it may be provided, at end manufacture, by enabling an additional component to perform that function. This may, for example, be achieved by programming a general purpose processor In FIG. 15B, the apparatus 2 is part of an electronic device 182. As used here 'device' refers to a unit or apparatus that includes certain parts/components that are added by an end manufacturer or a user. In the illustrated example, the device 182 comprises a resistive touch screen apparatus 2 and at least an additionally user input or output mechanism. In the illustrated example, an additional user input mechanism 184 is provided by a microphone and/or a key or keys and/or an accelerometer etc. In the illustrated example, an additional user output mechanism 186 is provided by a loudspeaker etc The device 182 may also comprise other 'additional components' 188 such as controllers, memory, processors, chip sets etc.

In the device 182 the controller 4 may be provided as an integral part of the resistive touch screen apparatus 2 (as illustrated) or it may be provided by an 'additional component', for example, by programming a general purpose processor of the device 182.

The device 182 may be a portable or mobile device.

The electronic device 182 may be a personal electronic device which is used mostly or entirely by one person as opposed to a device that is shared between many persons.

The electronic device may, for example, be hand-portable, for example, sized so that it can be carried in the palm of the hand, hand-bag or jacket pocket.

The electronic device 182 may operate as a computer and/or a radio communications device and/or a media player.

The blocks illustrated in the FIGS. may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

The first resistor R1 can be external or integrated with the controller 4.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a first resistive screen extending in a first direction and a second direction;
   a second resistive screen extending in the first direction and the second direction and separated from the first resistive screen;
   a first reference resistor;
   a voltage source configured to apply a voltage across a series combination of the first reference resistor and the first resistive screen;
   a voltage detector configured to measure a first voltage across the reference resistor; and
   a controller configured to have at least a one touch mode of operation for determining a location at which the first resistive screen is being touched bringing it into contact with the second resistive screen at one location and to have at least a two touch mode of operation for determining two locations at which the first resistive screen is being simultaneously touched bringing it into contact with the second resistive screen at two locations, wherein the mode of the controller is dependent upon the first voltage measured by the voltage detector, and wherein the controller is configured when in the two touch mode of operation to calculate a displacement from a centre location using a linear relationship between a deviation and the first voltage.

2. An apparatus as claimed in claim 1, wherein the first reference resistor has a magnitude at least one order of magnitude less than the resistance of the first resistive screen.

3. An apparatus as claimed in claim 1, wherein the controller is configured to enter the two touch mode of operation when the first voltage measured by the voltage detector increases in magnitude.

4. An apparatus as claimed in claim 1, wherein the controller is configured when in the two touch mode of operation to calculate the centre location representing a location midway between the two locations at which the first resistive screen is being simultaneously touched.

5. An apparatus as claimed in claim 1, wherein the voltage source is configured to apply the voltage across the first resistive screen in the first direction and the apparatus further comprises a voltage detector configured to measure a second voltage at a first extremity, in the second direction, of the second resistive screen; and
   a voltage detector configured to measure a third voltage at a second extremity, in the second direction, of the second resistive screen, wherein the controller is configured when in the two touch mode of operation to calculate the centre location representing a location midway between the two locations by averaging the second voltage and the third voltage.

6. An apparatus as claimed in claim 1, wherein the controller is configured when in the two touch mode of operation to calculate a displacement from the centre location using the first voltage.

7. An apparatus as claimed in claim 1, wherein the linear relationship uses a predetermined maximum value of the first voltage and a predetermined minimum value of the first voltage, to determine a range of the first voltage.

8. An apparatus as claimed in claim 1, wherein the maximum voltage is determined by electrically connecting the first screen and the second screen at the extremities, in the first direction, of the first resistive screen.

9. An apparatus as claimed in claim 1, wherein the controller is configured to disambiguate the location of the two touches by comparing the relative magnitudes :of the second voltage and the third voltage.

10. An apparatus comprising:
    a first resistive screen extending in a first direction and a second direction;
    a second resistive screen extending in the first direction and the second direction and separated from the first resistive screen;
    a first reference resistor;
    a voltage source configured to apply a voltage across a series combination of the first reference resistor and the first resistive screen;
    a voltage detector configured to measure a first voltage across the reference resistor; and
    a controller configured to have at least a one touch mode of operation for determining a location at which the first resistive screen is being touched bringing it into contact with the second resistive screen at one location and to have at least a two touch mode of operation for determining two locations at which the first resistive screen is being simultaneously touched bringing it into contact with the second resistive screen at two locations, wherein the mode of the controller is dependent upon the first voltage measured by the voltage detector, and wherein the controller is configured to switch between a first phase and a second phase, wherein in the first phase:

the voltage source is configured to apply a voltage across a series combination of the first reference resistor and the first resistive screen;

the first voltage detector is configured to measure a first voltage across the first reference resistor;

a second voltage detector is configured to measure a second voltage at a first extremity of the second resistive screen and a third voltage detector is configured to measure a third voltage at a second extremity of the second resistive screen, and wherein, in the second phase:

the voltage source is configured to apply a voltage across a series combination of a second reference resistor and the second resistive screen;

the first voltage detector is configured to measure a first voltage across the second reference resistor;

the second voltage detector is configured to measure a second voltage at a first extremity of the first resistive screen; and the third voltage detector configured to measure a third voltage at a second extremity of the first resistive screen in the first dimension.

11. An apparatus as claimed in claim 1, wherein the controller is configured so that if it enters the two touch mode of operation within a predetermined threshold time of calculating a first touch location in the one touch mode of operation, it determines a second touch location using the first touch location and a centre location.

12. An apparatus comprising:
a first resistive screen extending in a first direction and a second direction;
a second resistive screen extending in the first direction and the second direction and separated from the first resistive screen;
a first reference resistor;
a voltage source configured to apply a voltage across a series combination of the first reference resistor and the first resistive screen;
a voltage detector configured to measure a first voltage across the reference resistor; and
a controller configured to compare a touch location determined as a second touch of two sequential touches with a touch location determined as a second touch of two simultaneous touches and configured to enable calibration of the apparatus in dependence upon the outcome of the comparison.

13. A method comprising:
applying a voltage across a series combination of a first reference resistor and a first resistive screen;
measuring a first voltage across the reference resistor, wherein the first voltage increases when a user touches the first resistive screen at two distinct locations creating two distinct electrical connections between the first resistive screen and a second underlying resistive screen;
calculating a centre location representing a location midway between two locations at which the first resistive screen is simultaneously touched; and
calculating a displacement from the centre location using a linear relationship between a deviation and the first voltage.

14. A method as claimed in claim 13, comprising:
applying the voltage across the first resistive screen in a first direction;
measuring a second voltage at a first extremity, in the second direction, of the second resistive screen;
measuring a third voltage at a second extremity, in the second direction, of the second resistive screen; and
calculating the centre location by averaging the second voltage and the third voltage.

15. A method as claimed in claim 13 comprising: disambiguating the location of the two touches by comparing the relative magnitudes of the second voltage and the third voltage.

16. A computer program product tangibly embodying instructions which when used by a controller enables the controller to:
control the application of a voltage across a series combination of a first reference resistor and a first resistive screen;
detect a change in a first voltage measured across the reference resistor;
calculate a centre location representing a location midway between two locations at which the first resistive screen is simultaneously touched; and
calculate a displacement from the centre location using a linear relationship between a deviation and the first voltage.

17. A hand portable electronic device comprising the apparatus as claimed in claim 1 and an additional user input mechanism.

18. A computer program product as claimed in claim 16, tangibly embodying instructions which when used by a controller enables the controller to:
control the application of the voltage across the first resistive screen in a first direction;
measure a second voltage at a first extremity, in the second direction, of the second resistive screen;
measure a third voltage at a second extremity, in the second direction, of the second resistive screen; and
calculate the centre location by averaging the second voltage and the third voltage.

* * * * *